(12) United States Patent
Waco (10) Patent No.: US 6,418,734 B2
(45) Date of Patent: Jul. 16, 2002

(54) AIR CONDITIONING CLEANING APPARATUS, KITS & METHODS

(75) Inventor: Mark Waco, Pacoima, CA (US)

(73) Assignee: Moc Products Company, Inc., Pacoima, CA (US)

( * ) Notice: Subject to any disclaimer, the term of this patent is extended or adjusted under 35 U.S.C. 154(b) by 0 days.

(21) Appl. No.: 09/817,876

(22) Filed: Mar. 26, 2001

Related U.S. Application Data (62) Division of application No. 09/482,832, filed on Jan. 11, 2000, now Pat. No. 6,233,963
(60) Provisional application No. 60/136,689, filed on May 28, 1999.

(51) Int. Cl.[7] ............................... F24F 3/16; F28G 9/00
(52) U.S. Cl. ............................... 62/78; 62/303; 454/157
(58) Field of Search ............................. 62/78, 303, 309, 62/305, 637, 239, 244; 165/41, 95; 422/123, 124

(56) References Cited

U.S. PATENT DOCUMENTS

| | | | | |
|---|---|---|---|---|
| 3,885,401 A | * | 5/1975 | Banike | ........................ 62/303 |
| 4,677,902 A | * | 7/1987 | Takemasa | |
| 4,913,034 A | * | 4/1990 | Ripple et al. | |
| 5,664,423 A | * | 9/1997 | Akazawa | ................ 62/303 X |
| 5,737,937 A | * | 4/1998 | Akazawa | ..................... 62/303 |
| 5,911,742 A | * | 6/1999 | Akazawa | ................ 62/303 X |

* cited by examiner

Primary Examiner—Chen-Wen Jiang
(74) Attorney, Agent, or Firm—John J. Connors; Connors & Associates, Inc.

(57) ABSTRACT

Disclosed are apparatus, kits and methods for cleaning an air conditioning unit having an air conduit defined by at least one wall with a hole therein the allows a cleaner to be introduced between a fan and a heat exchanger of the unit positioned along the conduit. In one embodiment, the apparatus includes a resilient female component that is manually inserted into the hole. The female component has an opening therein that provides access to the conduit between the fan and the heat exchanger. A male component is removably received within the female component and it has a passageway therein that allows the cleaner to flow therethrough into the conduit. A plug is manually inserted into the opening upon removal of the male component. In another embodiment of the apparatus, a one way valve is attached to the wall at a point that allows a cleaner to be introduced between the fan and the heat exchanger of the unit, and a connector attached to a container of cleaner is removably attached to the one way valve. The connector, upon being attached to the one way valve, opens the valve. Upon being detached from the one way valve, the valve automatically opens. The kits hold the different pieces of the apparatus for assembly and connection to the air conditioning unit.

9 Claims, 8 Drawing Sheets

AIR CONDITIONING CLEANING APPARATUS, KITS & METHODS

RELATED APPLICATIONS

This application is a divisional of U.S. patent application Ser. No. 09/482,832, filed Jan. 11, 2000, entitled Air Conditioning Cleaning Apparatus, Kits & Methods, now U.S. Pat. No. 6,233,963, which in turn is a utility application based on U.S. provisional patent application Serial No. 60/136,689, entitled "Air Conditioning Cleaning Apparatus, Kit, & Method," filed May 28, 1999, both of these related applications are incorporated herein by reference and made a part of this divisional application.

BACKGROUND OF THE INVENTION

In U.S. Pat. Nos. 5,664,423 and 5,737,937 there are described systems for introducing a cleaning fluid into an automotive air conditioning unit. These systems require a nozzle to be inserted into the air steam flowing through the automotive air conditioning unit. This nozzle is connected through tubing to retainer structures within the driver/passenger compartment of the automotive vehicle into which the nozzle end of a container of cleaning fluid is inserted. These prior art systems contemplate reusing the container several times and are complex and expensive to install.

SUMMARY OF THE INVENTION

This invention comprises an apparatus for, and methods of, cleaning all air conditioning unit and kits used in connection with cleaning an air conditioning unit. The air conditioning unit has an air conduit defined by at least one wall with a hole therein that allows a cleaner to be introduced between a fan and a heat exchanger of the unit positioned along said conduit.

The apparatus includes a two-component connector. In one embodiment of the apparatus, a male and female component are employed. The female component is resilient and it is manually inserted into the hole in the wall of the air conditioning unit by compressing it upon insertion into the hole. This female component has an opening therein that provides access to the conduit between the fan and the heat exchanger. The male component is received within the opening in the female component. In this one embodiment, it is removably attached to the female component. This male component has a passageway therein that allows cleaner to flow therethrough into the conduit. Typically, the connector is removed from the hole in the wall and a plug is manually inserted into this hole. In this one embodiment, the male component is removed from the female component and the plug is inserted into the opening in the female component upon removal of the male component from the female component.

In the preferred embodiment of the apparatus of this invention, the first component is manually inserted into the hole in said wall, and it has a passageway and first and second ends. The first end extends into the wall and the second end extends outward from the wall. The passageway has an open mouth at its first end in communication with the conduit. The second component is disposed within the first component and its also has a passageway and first and second ends. The first end of the second component is connected to the second end of the first component and positioned inward of the open mouth of said first component and terminates at a position outward from the wall. The second end of the second component, which is also outward from the wall, is adapted to be placed in communication with a source of cleaner. Consequently, the cleaner upon being introduced flowing through the passageway in the second component and then through the passageway in the first component and out the open mouth into the conduit.

In another embodiment of the apparatus of this invention, a one way valve is permanently installed in the hole in the wall of the air conditioning unit. A connector at the discharge end of the container of cleaning fluid upon being forced into the one way valve, opens this valve to allow fluid to enter the air conditioning unit. Upon, detaching the connector from the one way valve, the valve automatically closes and remains in the wall of the air conditioning unit available for subsequent use.

The methods of this invention provide for cleaning an air conditioning unit having an air conduit defined by at least one wall and a fan and a heat exchanger of the unit positioned along said conduit.

One method includes the steps of:

(a) forming a hole in the wall positioned to allow a cleaner to be introduced into the conduit between the fan and the heat exchanger, (b) inserting into the hole a female component of a two-component connector, said female component having a opening therein that provides access to the conduit between the fan and the heat exchanger, (c) inserting into the opening in the female component a male component of the two-component connector, said male component being removably received within the female component and having a passageway therein that allows a cleaner to flow therethrough into the conduit, (d) feeding a cleaner into the conduit through the male component while said male component is inserted into the female component, (e) removing the male component from the female component after feeding cleaner into the conduit, and (f) upon removal of the male component from the female component inserting a plug into the opening in the female component.

A second method includes the steps of:

(a) forming a hole in the wall positioned to allow a cleaner to be introduced between the fan and the heat exchanger, (b) inserting into the hole a one way valve, (c) attaching to the valve to open said valve a connector on a container of a cleaner, (d) discharging the cleaner from the container through the connector and the valve into the air conditioning unit, and (e) detaching the connector from the valve with said valve automatically closing upon the connector being disconnected. The valve remains in place after detaching the connector.

A third method includes the steps of:

(a) forming a hole in the wall positioned to allow a cleaner to be introduced into the conduit between the fan and the heat exchanger, (b) inserting into the hole a connector having first and second components, said first component having a passageway and first and second ends, said first end extending into the wall and said second end extending outward from the wall, said passageway having an open mouth at said first end in communication with the conduit, and said second component being disposed within the first component and having a passageway and first and second ends, said first end of the second component being connected to the second end of the first component and positioned inward of the open mouth of said first component and terminating at a position outward from the wall, and (c) placing said second end of the second component into communication with a source of cleaner, said cleaner upon being introduced flowing through the passageway in the second component and then through the passageway in the first component and out the open mouth into the conduit.

The kits each include a connector and a plug used in connection with cleaning an air conditioning unit having a wall with a hole therein. Preferably, the kits also include a container of cleaning fluid with an outlet adapted to be removably attached to the connector.

In one embodiment of the kit of this invention, the kit includes a connector having a male component having has a passageway therein and a female component having an opening therein. The male component is within, or placed within, the opening in a female component. The female component is adapted to be fitted snugly in the hole in the wall of the air conditioning unit. With the female and male components connected and the female component in the hole, and the connector in communication with the container, upon release of the cleaning fluid from the container, the fluid flows through the passageway in the male component and through the opening in the female component into the air conditioning unit. If the male component is removably attached to the female component, the plug is adapted to be inserted into the opening in the female component. If the entire connector is removed from the hole in the wall, the plug is inserted directly into the hole.

In another embodiment of the kit of this invention, it includes a valve fitting adapted to be fitted snugly into a hole in the wall of the air conditioning unit and a container of cleaner. The valve fitting includes a one way valve, and the container has a connector adapted to be connected to the one way valve.

DESCRIPTION OF THE DRAWING

The preferred embodiments of this invention, illustrating all its features, will now be discussed in detail. These embodiments depict the novel and nonobvious air conditioning cleaning apparatus, kits, and methods of this invention as shown in the accompanying drawing, which is for illustrative purposes only. This drawing includes the following figures (FIGS).

DETAILED DESCRIPTION OF THE PREFERRED EMBODIMENTS

First Embodiment

Figures 1, 1A:
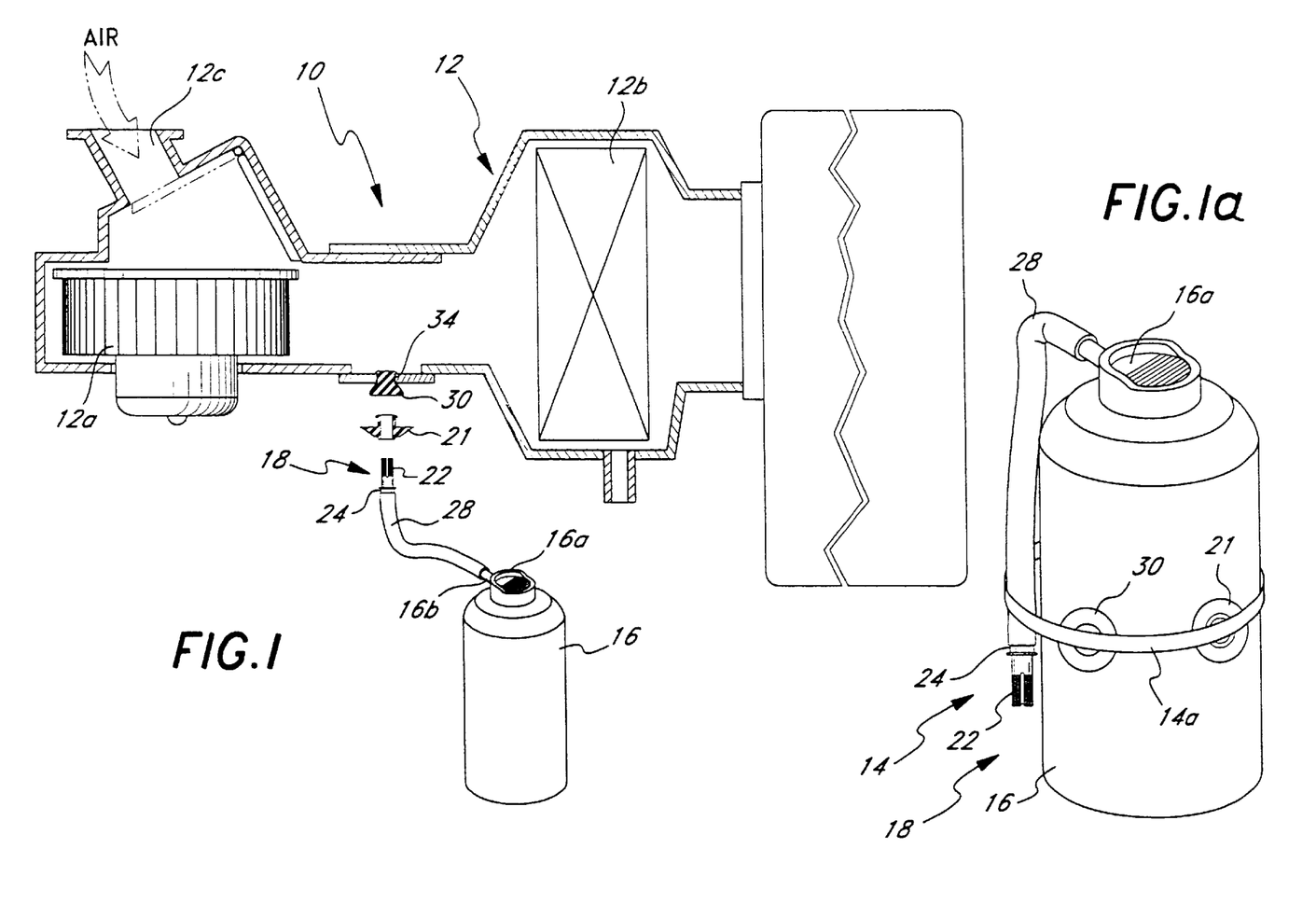
FIG. 1 is a schematic view of an automotive air conditioning unit employing the first embodiment of the cleaning apparatus of this invention.
FIG. 1a is a perspective view of a kit holding the major components of the first embodiment of this invention for delivering cleaner to the air conditioning unit.

As shown in FIG. 1, the first embodiment of this invention, apparatus 10, includes a conventional automobile air conditioning unit 12 which is depicted in substantially the same manner as illustrated in U.S. Pat. No. 5,737,937. The apparatus 10 comprises a system for delivering a foaming cleaner to the interior of the automobile air conditioning unit 12. As shown in FIG. 1a, the major components of the apparatus are retained in a kit 14, for example, including the following: (1) a container 16 of foaming cleaner, (2) a two-component connector 18 having a female component 20 and a male component 24, (3) a flexible hose 28 that preferably is transparent and has a length of from about 1 to about 2 feet, (4) a rubber stopper or plug 30, and (5) installation instructions (not shown). These components of the kit 14 are assembled into a package held together with a rubber band 14a, although other type of packaging such as, for example, boxes and baggies may b e employed. An installer drills a hole 32 (FIG. 5) about ⅜ inch in diameter into one wall 34 of the air conditioning unit 12 at about mid-way between the air conditioning unit's fan 12a and an evaporator/heat exchanger 12b. The lower wall 34 is used only for illustration, since any wall providing easy access would be suitable.

Figure 2:
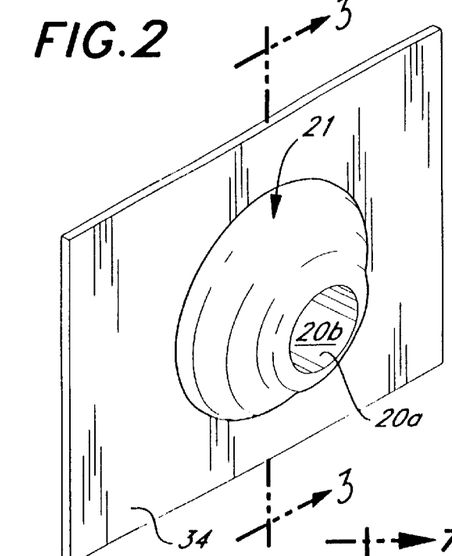
FIG. 2 is a perspective view of one wall of the automotive air conditioning unit shown in FIG. 1 with a grommet of a connector used in this invention force fitted into a hole drilled in this wall.
Figure 3:
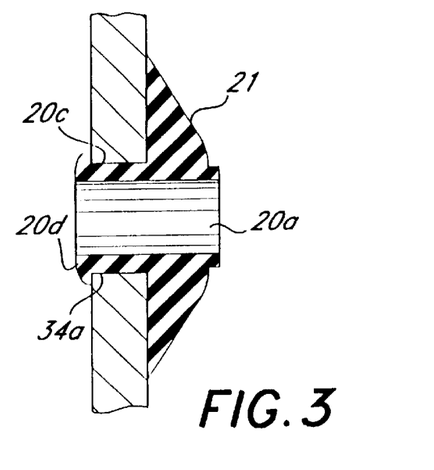
FIG. 3 is a cross-sectional view taken along line 3—3 of FIG. 2.
Figures 4, 5, 6, 7:
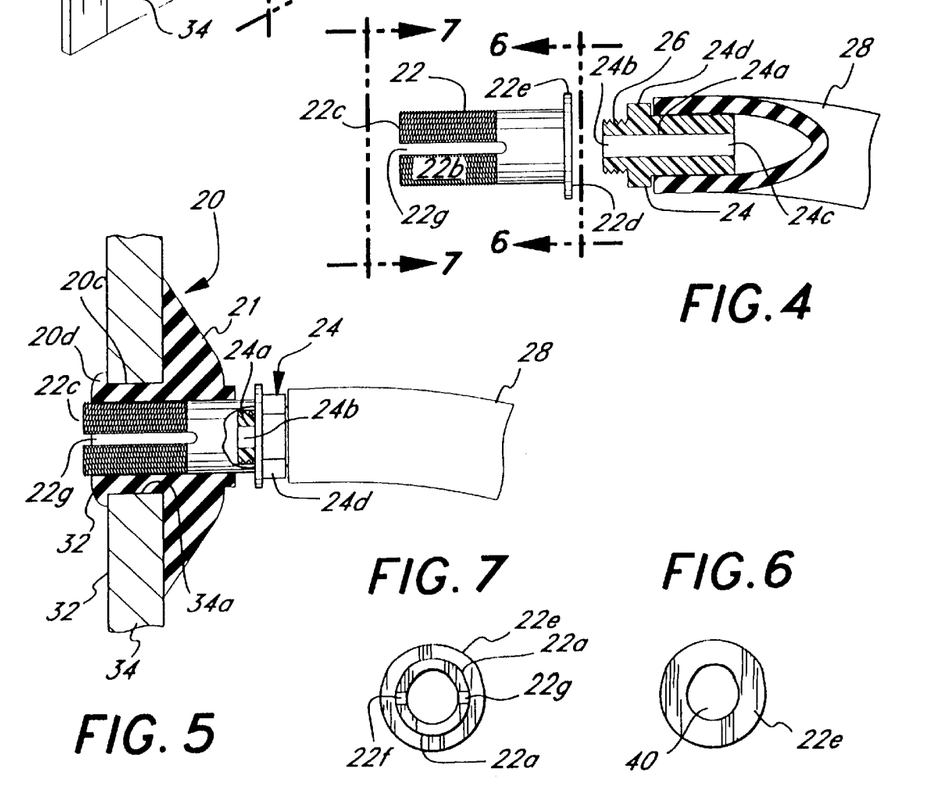
FIG. 4 is a side elevational view, partially in cross-section, showing the male component of the connector shown in FIG. 1 being attached to one end of a hose that is attached to a container of cleaner.
FIG. 5 is a cross-sectional view showing the male component of the connector shown in FIG. 1 attached to the female component of the connector.
FIG. 6 is a cross-sectional view taken along line 6—6 of FIG. 4.
FIG. 7 is a cross-sectional view taken along line 7—7 of FIG. 4.

As illustrated in FIGS. 2 and 5, the female component 20 of the connector 18 has two parts: a rubber grommet 21 and a tubular component 22. The rubber grommet 21 has an opening 20a (FIG. 2) with a passageway 22a therein (FIG. 7). It is inserted into the wall 34 so that it is downstream of the air inlet 12c and next to the fan 12a which pulls air into the air conditioning unit 12 through the inlet. The rubber grommet 21 has extending through it the opening 20a which has a smooth internal surface 20b. This grommet 21 is force-fitted into the hole 32 in the wall 34 and is deformed or compressed upon insertion into the hole. It has an annular groove 20c (FIG. 3) about its distal end 20d. This distal end 20d is compressed as the installer inserts it into the hole 32. Upon the distal end 20d passing through the hole 32 in the wall 34, it expands and the rim 34a of the hole is retained in the groove 20c.

As depicted in FIG. 1, during normal operation of the air conditioning unit 12, the plug 30 is pushed or force fitted into the opening 20a in the grommet 21. During cleaning of the air conditioning unit 12, this plug 30 is removed and the tubular component 22 of the connector 18 is pushed into the opening 20a in the grommet 21. As best shown in FIGS. 4, 5, 6 and 7, this tubular component 22 comprises a cylindrical wall 22a with a knurled surface 22b, an open distal end 22c and an open proximal end 22d with an annular flange 22e that acts as a stop. The cylindrical wall 22a forms a passageway or tunnel 40 with a diameter that is only slightly less than ⅜ inch, and it has opposed slots 22f and 22g in it that allow the cylindrical wall to decrease in diameter as the tubular component 22 is pushed and force-fitted into the opening 20a in the grommet 21. The knurled surface 22b improves the grip between the grommet 21 and the tubular component 22 upon engagement. The distal end 22c of the tubular component 22 may extend slightly beyond the distal end 20d of the grommet 21 as shown in FIG. 5. The inside surface (not shown) of the cylindrical wall 22a at the proximal end 22d is threaded.

As shown in FIG. 4, the male component 24 has a passageway 24a extending along its longitudinal axis. The passageway 24a has open opposed ends 24b and 24c, with a raised stop element 24d about midway between these ends. The diameter of this passageway 24a is substantially smaller than the diameter of the tunnel 40 in the tubular component 22. For example, the diameter of the passageway 24a is about 1/16 to ⅛ inch when used with a tubular component 22 having an inside diameter of about ⅜ inch (the tunnel diameter). The distal end 24b of the male component 24 is threaded and it screws into the proximal end 22d of the tubular component 22. The proximal end 24c of the male component 24 is force fitted into an open end 28a of the hose 28 that is connected to the container 16 of cleaner. Upon connecting the male component 24 and female component 20, the distal end 24b of the male component 24 terminates at or near the exterior of the wall 34 of the air conditioning unit 12. This male component 24 does not extend into the air conditioning unit 12. When the foaming cleaner is discharged from the container 16, it flows as a stream of fluid through the passageway 24a and out the distal end 24b, through the tunnel 40 formed by the cylindrical wall 22a of the tubular component 22, and into the air conditioning unit 12. With the connector 18 installed as shown in FIG. 5, upon pressing a control button 16a, or similar structure on the container 16, the foaming cleaner exits a nozzle 16b, flows through the hose 28 and coupled together male component 22 and female component 20, and enters the air conditioning unit 12. It flows through the passageway 24a in the male component 24, exiting the passageway 24a at the distal end 24a as a compact stream that passes through the tunnel 40 formed by the cylindrical wall 22a of the male component 22. This stream upon passing through the tunnel 40 exits the distal end 22c and is captured by the stream of air flowing through the air conditioning unit 12 and is mixed therewith. The entire contents of the container 16 (the foaming cleaner) are delivered into the interior of the air conditioning unit 12 while the hose 28 is attached to the connector. The foaming cleaner is delivered with sufficient force to disperse it adequately in the air stream flowing through the air conditioning unit 12.

The tubular component 22, while attached to the male component 24, is removed from the grommet 21 when the entire contents of the container 16 have been discharged. The plug 30 is then inserted into the opening 20a in the grommet to prevent the foaming cleaner or other material from escaping from the air conditioning unit through the opening 20a. The empty container 16 is then discarded. The assembly of the tubular component 22 and the male component 24 may be disconnected from the hose 28 and used repeatedly with another container of cleaner. In such a case, the plug 30 is removed and the assembly of the tubular component 22 and the male component 24 is reinserted into the open end of a flexible hose extending from another full container of cleaner.

Second Embodiment

Figures 8, 9:
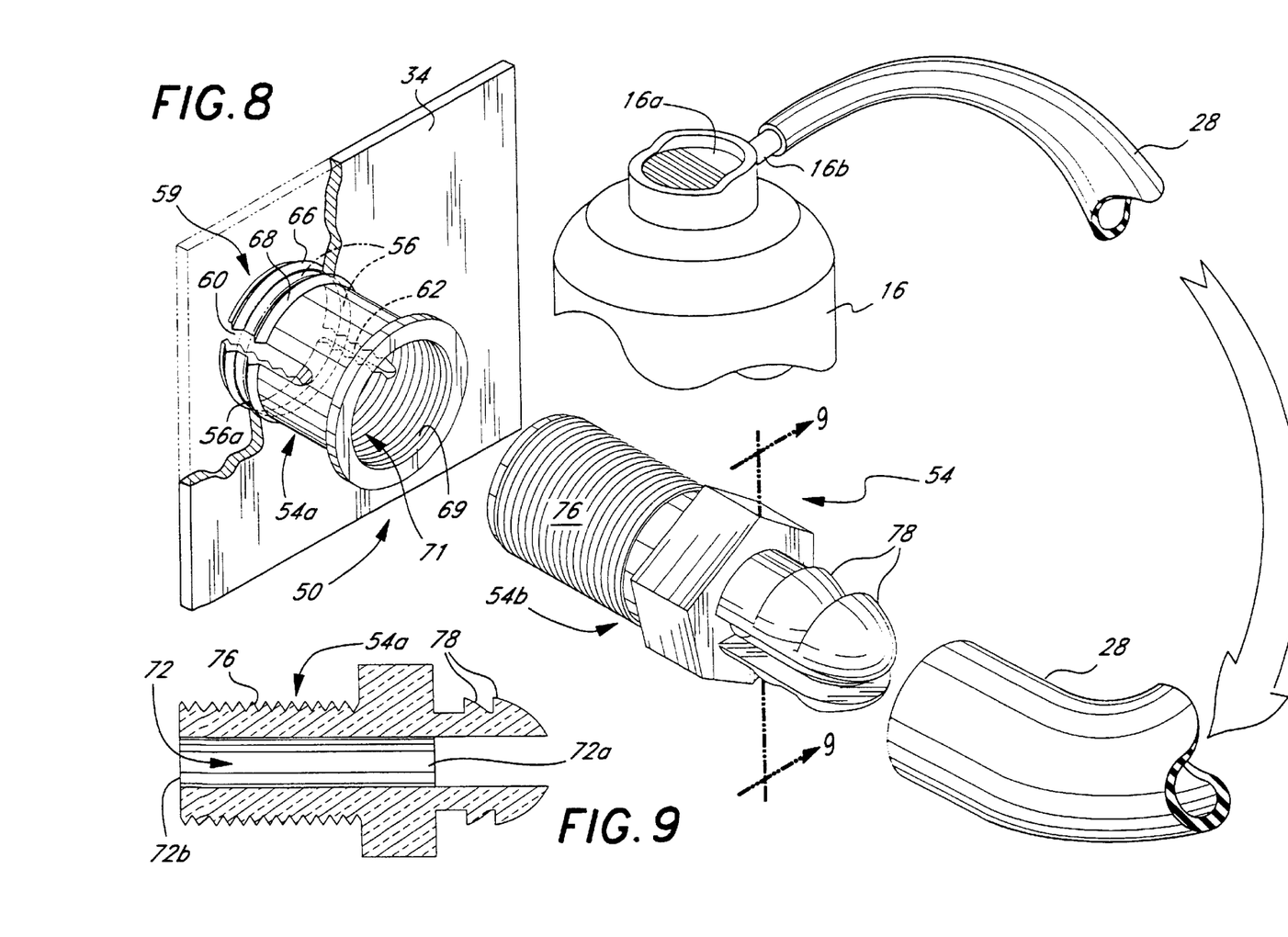
FIG. 8 is a perspective view of a second embodiment of this invention employing a different type of connector than that depicted in FIGS. 1 through 7.
FIG. 9 is a cross-sectional view of the male component of the connector shown in FIG. 8.

The second embodiment of this invention, the apparatus 50, is also used with a conventional air conditioning unit 12 such as depicted in FIG. 1. Its major components are retained in a kit (not shown) similar to that depicted in FIG. 1a, for example, a box holding (1) a container 16 of foaming cleaner, (2) a two-component connector 54 having a female component 54a and male component 54b, (3) a plug 30, (4) a hose 28, and (5) installation instructions (not shown). As shown in FIG. 8, an installer drills a ⅜ inch diameter hole 56 into an easy accessible wall of the air conditioning unit 12, for example, the lower wall 34, at about mid-way between the fan 12a and evaporator/heat exchanger 12b. The female component 54a of the connector 54 is inserted by force fitting it into this hole 56 so that it is downstream of the air inlet 12c next to the fan 12a that pulls air into the air conditioning 12 unit through an inlet. The female component 54a is made of brass and is in the shape of a hollow cylinder. Its distal end 59 has a pair of opposed slots 60 and 62 (shown in phantom) in it that allows its cylindrical wall 64 to be compress to reduce its diameter. The installer compresses this distal end 59 and inserts it into the hole 56 in the wall 34 of the air conditioning unit 12. Upon releasing the distal end 59, the cylindrical wall 64 of the female component 54a expands and the rim 56a of the hole 56 in the wall is grasped between two annular ribs 66 and 68 along the perimeter of the distal end 59 of the female component.

The interior 69 of the cylindrical wall 64 of the female component 54a at its proximal end 70 is threaded. Like the first embodiment, during normal operation of the air conditioning unit, a plug 80 (FIG. 8A) is inserted into an open passageway 71 extending through the female component 54a. In this second embodiment, the plug 80 is made of brass and it is treaded so that it may be screwed into the proximal end 70 of the female component 54a. During cleaning, this brass plug 80 is removed by unscrewing it and the male component 54b of the connector 54 is screwed into the proximal end 70 of the female component 54a.

This male component 54b is made of brass and it has a passageway 72 (FIG. 9) extending along the its longitudinal axis. The passageway 72 has open opposed ends 72a and 72b. The exterior 76 of the male component is threaded to enable it to be attached and detached by screwing and unscrewing it into the proximal end 70 of the female component 54a. The open distal end 72a of the male component 54a is along the inside of the lower wall of the air conditioning unit when the male component has been screwed into the passageway 71 of the female component 54a. Prongs 78 surrounding the open proximal end 72b of the male component 54b are pushed into one end of the flexible hose 28 that has its other end attached the nozzle 16b of the container 16 of foaming cleaner.

With the connector 54 installed as shown in FIG. 8, upon pressing the control button 16a on the container, the foaming cleaner enters the air conditioning unit 12. The entire contents (the foaming cleaner) of the container 16 are delivered into the interior of the air conditioning unit 12 while the hose is attached to the assembled connector 54. The male component 54b is disconnected from the female component 54a when the entire contents of the container have been discharged. The brass plug 80 is then screwed into the proximal end 70 of the female component 54a to prevent the foaming cleaner or other material from escaping from the air conditioning unit 12 through the female component. The empty container is then discarded. The female component 54a of the connector 54 may be used repeatedly by removing the plug 80 and reinserting another male component that is connected by a flexible hose to another full container of cleaner.

Third Embodiment

Figure 10:
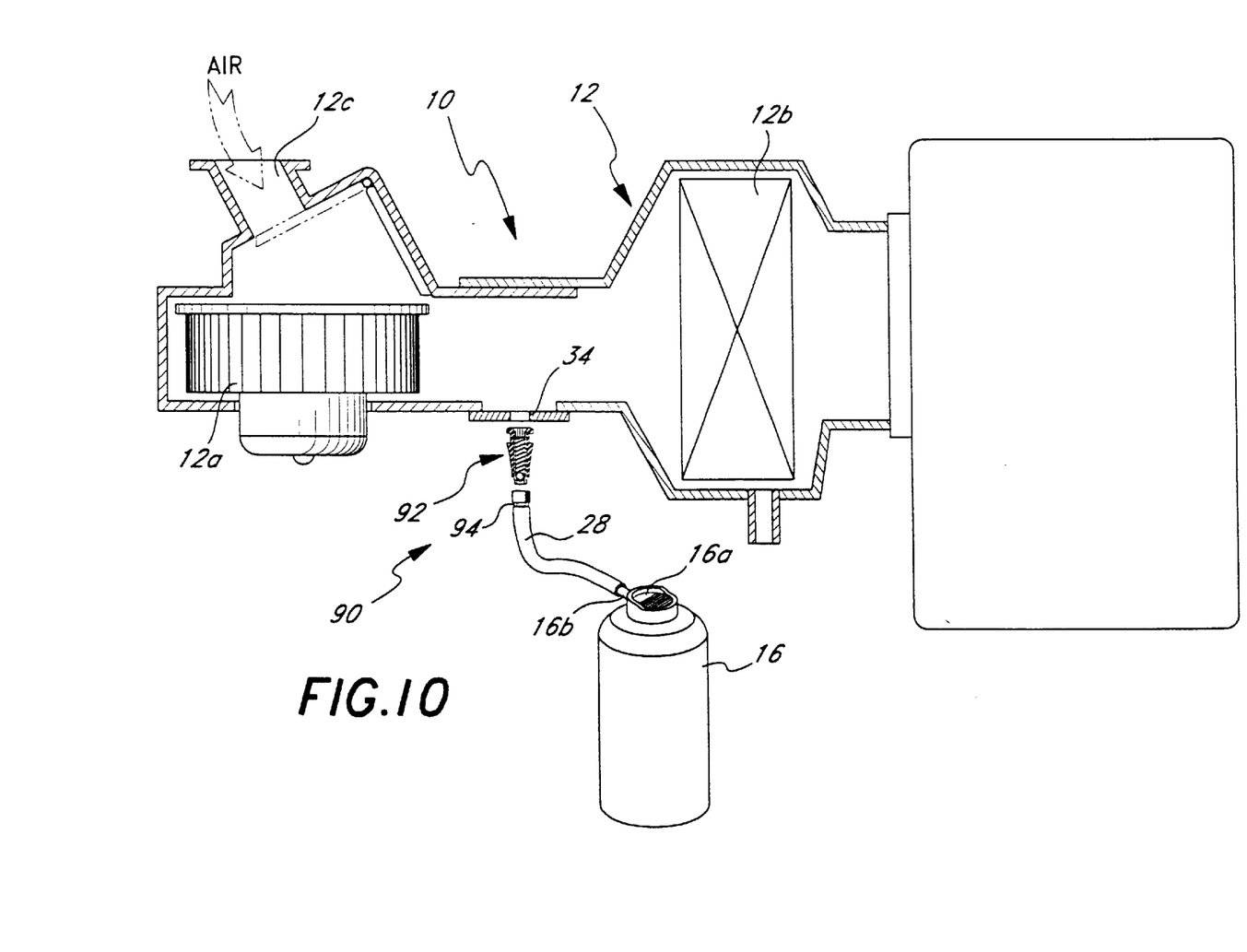
FIG. 10 is a schematic view of an automotive air conditioning unit employing the third embodiment of the cleaning apparatus of this invention.

The third embodiment of this invention, the apparatus 90 depicted in FIG. 10, employs a one way valve fitting 92 (similar to a grease fitting) installed in the lower wall 34 of the air conditioning unit 10 between its fan 12a and evaporator/heat exchanger 12b. A hole 94 (FIG. 11) is drilled into the lower wall 34 and the valve fitting 92 is screwed into position. The valve fitting 92 is downstream of the air inlet 12c next to the fan 12a that pulls air into the air conditioning unit 10 through an inlet. Once this valve fitting 92 is installed it may b e used repeatedly. With the hose 28 connected to the valve fitting 92, it opens as the foaming cleaner exits the container 16 an flows through the hose 28 into the fitting. The fitting 92 includes a one way valve 96 that allows the foaming cleaner to enter the air conditioning unit 10. Upon pressing the control button, with the hose 28 attached to the valve fitting 92, the entire contents of the container 16, the foaming cleaner, is delivered through the valve 96 into the interior of the air conditioning unit 10.

Figure 11:
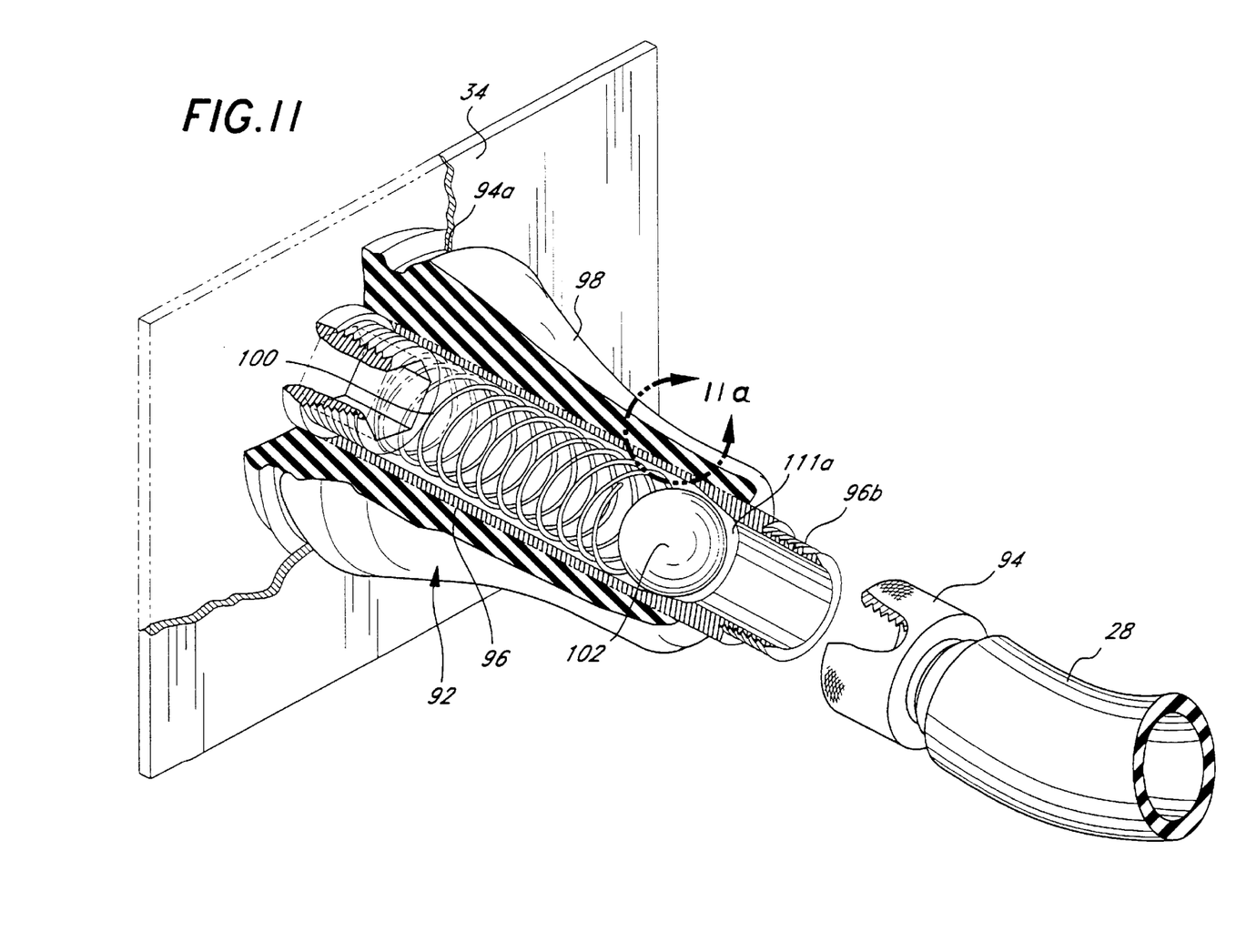
FIG. 11 is perspective view, with sections broken away, of the one way valve fitting used in the third embodiment of this invention, showing a screw on attachment for placing the fitting in communication with a container of cleaner.
Figures 11A, 13, 14:
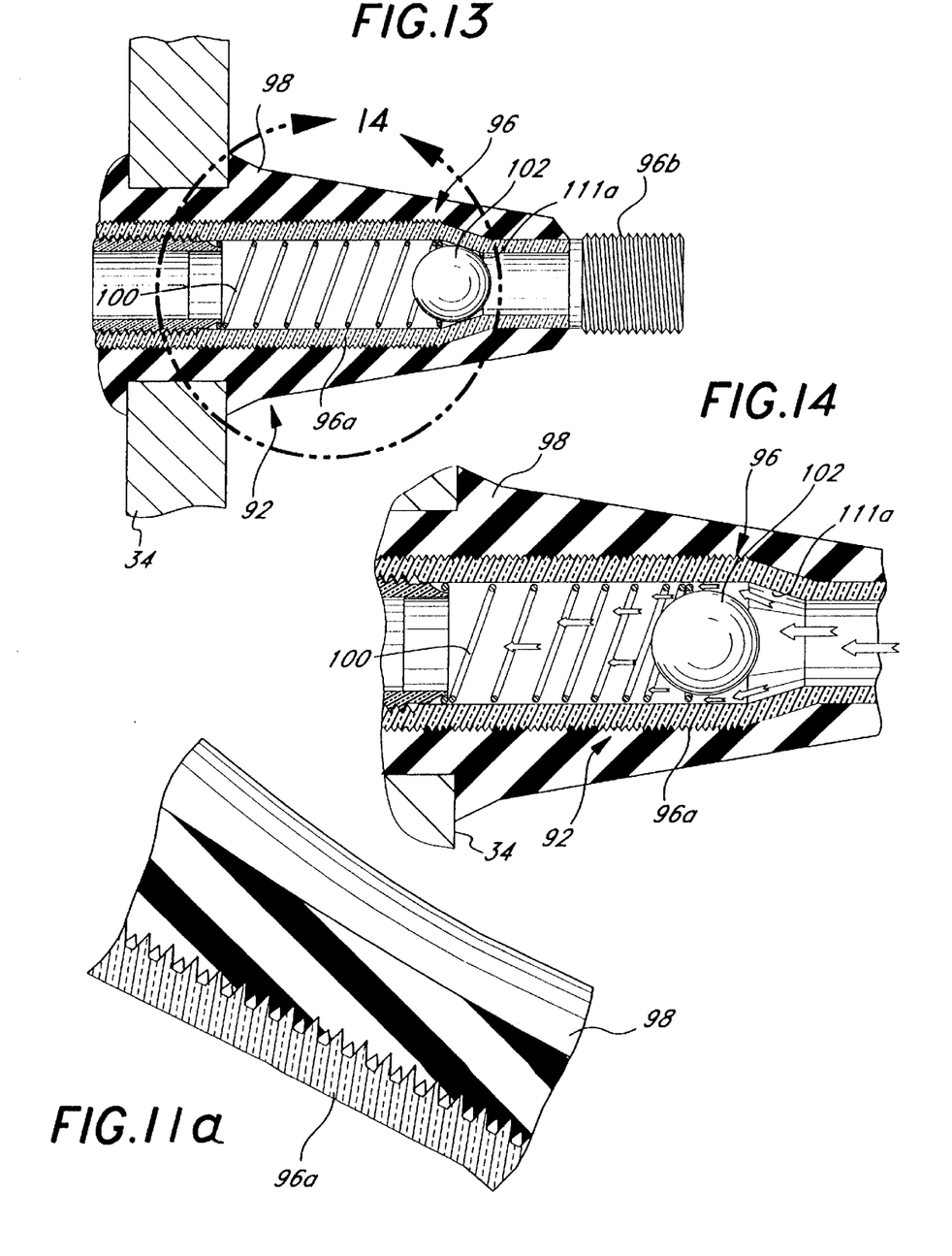
FIG. 11a is an enlarged fragmentary view taken along line 11a of FIG. 11.
FIG. 13 is a cross-sectional view of the valve fitting showing the valve in a closed position.
FIG. 14 is a cross-sectional view taken along line 14 of FIG. 13 showing the valve in an open position.
Figure 12:
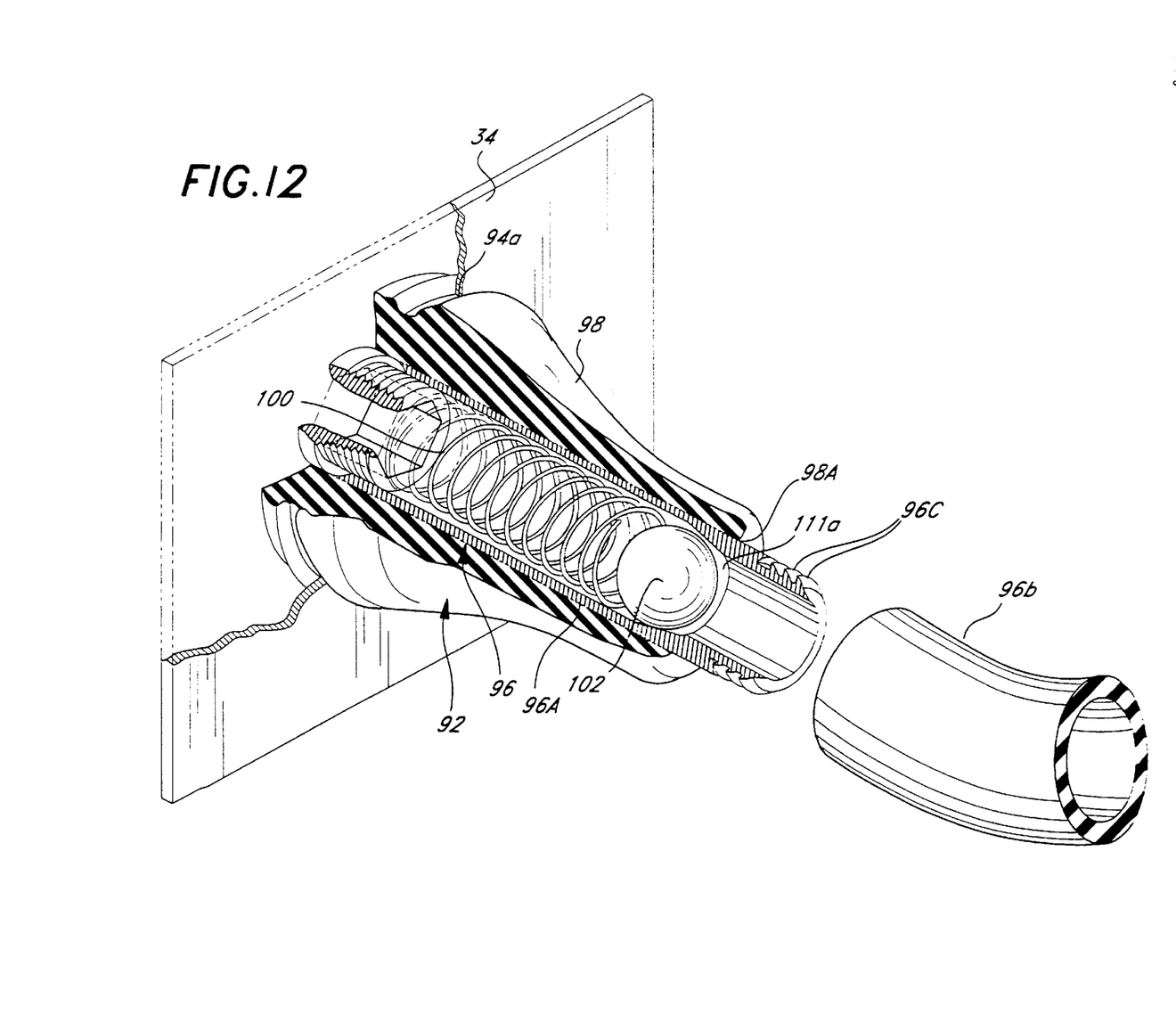
FIG. 12 is perspective view similar to that of FIG. 11, with sections broken away, of the one way valve fitting used in the third embodiment of this invention, showing a barbed end piece which is force into the hose coming from the container of cleaner.

As best shown in FIG. 11, the valve 96 has a tubular wall 96a that 2b fits snug within a passageway 98a extending through a grommet 98 that fits within the hole 94a. As best shown in FIG. 11a, the exterior surface of the tubular wall 96a is knurled so that this knurled surface grips firmly the interior of the passageway 98a in the grommet 98. As shown in FIG. 11, there may be a threaded connector 94 at the end of the hose 28. This threaded connector 94 screws onto the open, threaded end 96b of the wall 96a to connect the hose 28 to the fitting 92. Alternately, as shown in FIG. 12, the tubular wall 96a may terminate in a barbed end 96c, and the hose with any connector may be directly attached to this barbed end.

Housed within the tubular wall 96a is a coiled spring 100 and seated at one end of the spring is a ball 102. The spring 100 normally urges the ball 102 into contact with a seat linear the open end 96b or 96c of the tubular wall 96a to close this open end. With the hose 28 extending from the container 16 connected to the fitting 92, discharging the contents of the container causes the foaming cleaner to push against the ball 102 and compress the spring 100 as shown in FIG. 14, opening the valve 96 and allowing the entire contents of the container to flow into the air conditioning unit 10. When the delivery hose 28 is disconnected from the valve fitting 92, the valve 96 in the fitting closes automatically, preventing the foaming cleaner or other material from escaping from the air conditioning unit 10 through the valve. The empty container 16 is then discarded. This third embodiment initially comes in a kit as discussed above.

Fourth Embodiment

Figure 15:
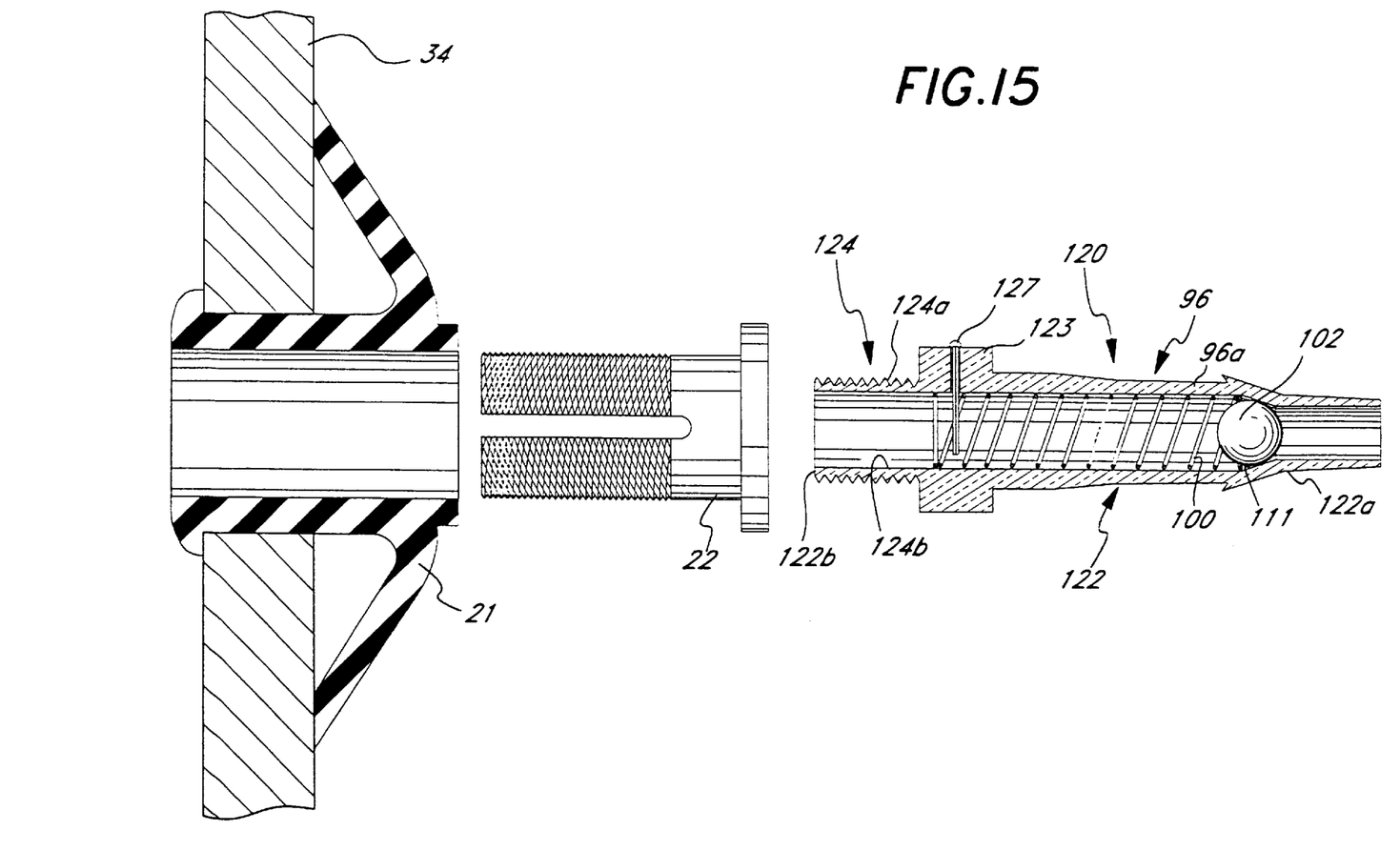
FIG. 15 is an exploded cross-sectional view showing a forth embodiment employing a valve fitting different than that of the third embodiment.

As shown in FIG. 15, the fourth embodiment, the apparatus 120, includes a brass valve 122, similar to valve 96 in that it has a tubular wall 96a enclosing a spring 100 and ball 102 at the end thereof that is normally seated on a seat 111 at the end 122a. The ball 102 compresses the spring and opens the valve 122 in response to cleaner flowing from the container 16. The one end 122a of the tubular wall 96a is barbed so that the hose 28 without any connector may be forced over this end 122a. There is a raised annular stop element 123 between the end 122a and the end 122b with a pin 127 partially extending into the valve 122 that serves as stop for the spring 100. The valve 122 has at the end 122b a brass insert 124 having a threaded exterior surface 124a. The brass insert 124 is screwed into the tubular component 22 which in turn is forced into the grommet 21. The valve 96 functions as discussed previously. After using, the assembly of the brass insert 124 and the valve 122 may be reused. In this embodiment the brass insert 124 is the male component and its one end 124b is positioned outward from the wall 34 when it is placed within the female component comprising the grommet 21 and the tubular component 22.

General

In all these embodiments of this invention, no nozzle is positioned inside the air conditioning unit 12, and no such nozzle is needed or used, because the foaming cleaner is delivered with sufficient force to disperse it adequately in the air stream flowing through the air conditioning unit. In fact, the fluid cleaner in all these embodiments is discharged either at or from outside the wall 34 and flows through the wall into the interior of the air conditioning unit 10. The container 16 is not placed in any type of apparatus for ejecting the contents of the container into the automobile air conditioning located in the driver's/passengers' compartment of a vehicle employing the air conditioning unit. Although the male and female components in these embodiments have been depicted a separate elements that are detachable, it is possible that they may be integrated as a unitary structure. In some instances, they have been made of metal, but they may also be formed from other material such as, for example, plastic.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. A method of cleaning an air conditioning unit having an air conduit defined by at least one wall and a fan and a heat exchanger of the unit positioned along said conduit, said method including the steps of:

(a) forming a hole in the wall that is positioned to allow a cleaner discharged from a container to be introduced between the fan and the heat exchanger, (b) inserting into the hole a connector that is manually force-fitted into the hole, said connector having a first component that upon insertion of the connector into said hole is compressed, said first component including a cylindrical wall forming a tunnel with a predetermined diameter, said tunnel terminating in an opening that provides access to the interior of the air conditioning unit through said hole in the wall of the air conditioning unit, a second component that is connected to the first component, said second component having a passageway therein that allows the cleaner upon discharge from the container to flow through said passageway into the interior of the air conditioning unit, the diameter of said passageway in the second component being substantially smaller than the diameter of the tunnel, said second component having a proximal end and a distal end that terminates at or near the wall of the air conditioning unit but does not extend into the interior of the air conditioning unit upon insertion of the connector into the hole in the wall of the air conditioning unit, (c) attaching the proximal end of the second component to the container of cleaner, (d) discharging the cleaner from the container through the connector into the air conditioning unit, and (e) detaching the connector from the container.

2. The method according to claim 1 where the connector includes an annular flange between the opening in the first component and the proximal end of the second component.

3. A method of cleaning an air conditioning unit having an air conduit defined by at least one wall and a fan and a heat exchanger of the unit positioned along said conduit, said method including the steps of:

(a) forming a hole in the wall that is positioned to allow a cleaner discharged from a container to be introduced between the fan and the heat exchanger, (b) inserting into the hole a connector that is manually force-fitted into the hole, said connector having a first component that upon insertion of the connector into said hole is compressed, said first component having a tunnel there through with a predetermined diameter, said tunnel terminating in an opening that provides access to the interior of the air conditioning unit, a second component that is connected to the first component, said second component having a passageway therein that is in communication with the tunnel to allow the cleaner upon discharge from the container to flow through said passageway and tunnel into the interior of the air conditioning unit, the diameter of said passageway in the second component being substantially smaller than the diameter of the tunnel, (c) attaching the proximal end of the second component to the container of cleaner, (d) discharging the cleaner from the container through the connector into the air conditioning unit, and (e) detaching the connector from the container.

4. The method according to claim 3 where the proximal end of the second component is attached by a hose member to the container prior to discharging the cleaner from the container through the connector into the air conditioning unit.

5. The method according to claim 4 where the proximal end of the second component fits into an open end of the hose member.

6. The method according to claim 4 where the connector includes a stop element between the opening in the first component and the proximal end of the second component.

7. The method according to claim 4 where the hole is closed after detaching the connector from the container.

8. A method of cleaning an air conditioning unit having an air conduit defined by at least one wall, said method including the steps of:

(a) forming a hole in the wall to allow a cleaner discharged from a container to be introduced into the air conditioning unit, (b) providing a connector having at a first end a first tubular component with a first passageway therein with a predetermined diameter and at a second end a second tubular component with a second passageway therein that is in communication with the first passageway to allow the cleaner upon discharge from the container to first flow through said second passageway and then through the first passageway into the interior of the air conditioning unit, the first tubular component being compressible and the diameter of said second passageway being smaller than the diameter of the first passageway, (c) inserting into the hole the first end of the connector, said first end being compressed upon insertion into the hole, (d) attaching via a hose member the second end to the container of cleaner, (d) discharging the cleaner from the container first through the hose member and then through the connector into the air conditioning unit, and (e) detaching the connector from the container and then closing the hole.

9. The method according to claim 8 where the connector includes a stop element between the first and second ends.

* * * * *